United States Patent [19]
Engle

[11] 3,881,784
[45] May 6, 1975

[54] VARIABLE PROPORTIONING RELAY VALVE

[75] Inventor: Thomas Engle, Cape Vincent, N.Y.

[73] Assignee: General Signal Corporation, Rochester, N.Y.

[22] Filed: Nov. 9, 1973

[21] Appl. No.: 414,479

[52] U.S. Cl. .................................... 303/22 A
[51] Int. Cl. ..................................... B60f 8/18
[58] Field of Search ....... 137/596.18; 303/22, 22 A, 303/23 R, 23 A, 21 A, 21 B

[56] References Cited
UNITED STATES PATENTS

| | | | |
|---|---|---|---|
| 1,842,497 | 1/1932 | Whitaker | 303/22 R |
| 2,418,013 | 3/1947 | Cook | 303/22 R |
| 2,940,796 | 6/1960 | Ortmann et al. | 303/22 A |
| 3,369,846 | 2/1968 | Scott | 303/22 A |
| 3,425,752 | 2/1969 | Pollinger et al. | 303/22 A X |
| 3,597,013 | 8/1971 | Shah | 303/22 A |
| 3,730,597 | 5/1973 | Pickart | 303/22 A |

Primary Examiner—Martin P. Schwadron
Assistant Examiner—Robert J. Miller
Attorney, Agent, or Firm—Pollock, Philpitt & Vande Sande

[57] ABSTRACT

A variable proportioning relay valve for use in a brake control system is disclosed. The valve has mainline air pressure inlet and delivery ports, mainline a control signal air pressure inlet and a proportioning control air pressure inlet. As the control signal pressure varies, the mainline outlet or delivery pressure varies. As the proportioning control pressure varies, the ratio between the control signal and the mainline pressure varies. This ratio may vary from below a 1:1 ratio to above a 1:1 ratio, depending on the physical parameters selected. The control signal air pressure is supplied to a control diaphragm. The ratio is varied by separating the control diaphragm into input and output diaphragms, and interposing a lever having a variable fulcrum therebetween. As the fulcrum or pivot point for the lever is moved, the ratio response between the inlet control diaphragm and the outlet control diaphragm is varied. The output pressure is thereby subjected to two variables; first, a variable control pressure, and second, a variable ratio between the variable control pressure and the output pressure.

6 Claims, 4 Drawing Figures

VARIABLE PROPORTIONING RELAY VALVE

BACKGROUND OF THE INVENTION

This invention relates to relay valves that are commonly used in pneumatic control systems. The pneumatic relay valve uses a control pressure having a reduced volumetric flow capacity to regulate a mainline valve having a high volumetric flow rate capacity. Commonly, relay valves are used in pneumatic brake systems for trains and subways vehicles to supply and exhaust brake cylinder air pressure during brake applications and releases. These relay valves are designed to develop in the broke cylinders a pressure aproximately equal to that developed in the control pipe leading to the relay valve.

Quite often relay valves may also vary the pressure in the output line. For example, one valve may reproduce 80 percent of the control line pressure in the mainline brake pipe. Another valve may be so constructed as to produce 90 percent and so on. In some instances, where the pressure supplies are adequate, the relay valve may provide a mainline pressure which exceeds a one-to-one ratio and is higher than the control pressure.

In addition to being used in brake pipe control lines, relay valves are often used in variable load control systems and in speed control systems to regulate the control pressure supplied to the downstream components of the control system.

For example, in a variable load brake system, it is desired to prevent the application of the full brake pipe pressure to the brakes of an empty car, since a full brake application would cause the wheels of an empty car to slide. Conversely, the full braking force required for an empty car would be insufficient to quickly and safely stop fully loaded car. The variable load brake systems in use on railroad and lightrail vehicles varies the full braking force in accordance with the load carried by the car. The load may be sensed by means of an air spring and is transmitted to a variable load control valve such as that disclosed and described in U.S. Pat. No. 3,730,597, Lin E. Pickart. With this type of variable load brake valve, the valve must be combined with a relay valve to provide the volumetric flow rate needed for a full service brake application. Since a modern brake system may involve four or five independently variable subsystems, each of which will alter the eventual brake pipe pressure, it cna be seen that a multiplicity of valves and components will result.

OBJECT OF THE INVENTION

It is therefore an object of the present invention to provide a variable ratio relay valve which will serve as a mainline relay valve when necessary, and which will also combine the functions of one or more regulatory components in a brake control system. The valve of the present invention is intended to provide a relay section which will reproduce, throughout a given pressure range, a delivery pressure that is equivalent to the incoming control signal. As the control signal varies, the output or delivery pressure varies. The present invention also envisions the use of a variable ratio means interposed within the control means to vary the ratio between the control signal pressure and the output or delivery pressure of the valve.

In an application of the present invention to a variable load weigh system for a railway or subway vehicle, the load weighing is done with a variable ratio relay valve wherein a control pressure is developed from a control system and this control pressure varies according to the speed of the train. Ths control pressure is reproduced in the output pressure of the relay valve. The load-weigh system is connected to the variable ratio or proportional control portion of the valve and is used to vary the output exhaust pressure from 80 to 100 percent of the control pressure, depending upon the weight of the vehicle or the pressure in the control signal line.

In another application of the present invention, the variable ratio relay valve will repeat a control signal in its output or delivery line, wherein the input control signal is multiplied by a ratio between 1.0 and 0.75 depending upon the value of a ratio control pressure. The ratio control signal pressure varies according to the speed of the vehicle.

The variable ratio relay valve may be used to combine the functions of a normal load-weigh valve and relay valve. It may also combine the functions of two independent regulator portions of the control system, while simultaneously providing a relay valve with a high volumetric throughput rate.

It is an object of te present invention to provide a variable relay valve by dividing the control signal means that receives the input control signal into two parts. This means has an input control means and an output control means wherein the input control means receives the input control signal and the output control means reproduces that signal in controlling the relay valve portion of the relay valve. A ratio control means is interposed between the input control means and the output control means to alter the ratio between the two in accordance with a given ratio control signal. In the present invention, a diaphragm is used as the input control means, and a second matching diaphragm of equivalent area is used as the output control means. A lever with a variable fulcrum is placed therebetween to provide a variable pivot point adapted to vary the leverage ratio between the two diaphragms. The variable ratio control means is then connected to the fulcum point to shift it back and forth in accordance with the ratio control signal. As the pivot point for the lever is shifted, the amount of force translated from the input control diaphram to the output control diagphram is changed, It is increased or decreased depending upon the specific placement of the pivot point at a given point in time. The placement of that pivot point is regulated by a mechanical servo linkage connected to a variable ratio diaphram. The servo mechanism reproduces the variable ratio control signal in sufficient magnitude to alter the pivot point of the lever when operating loads are imposed upon the lever.

DETAILED DESCRIPTION OF THE DRAWINGS

DETAILED DESCRIPTION OF THE PREFERRED EMBODIMENTS

Figures 1, 2, 3:
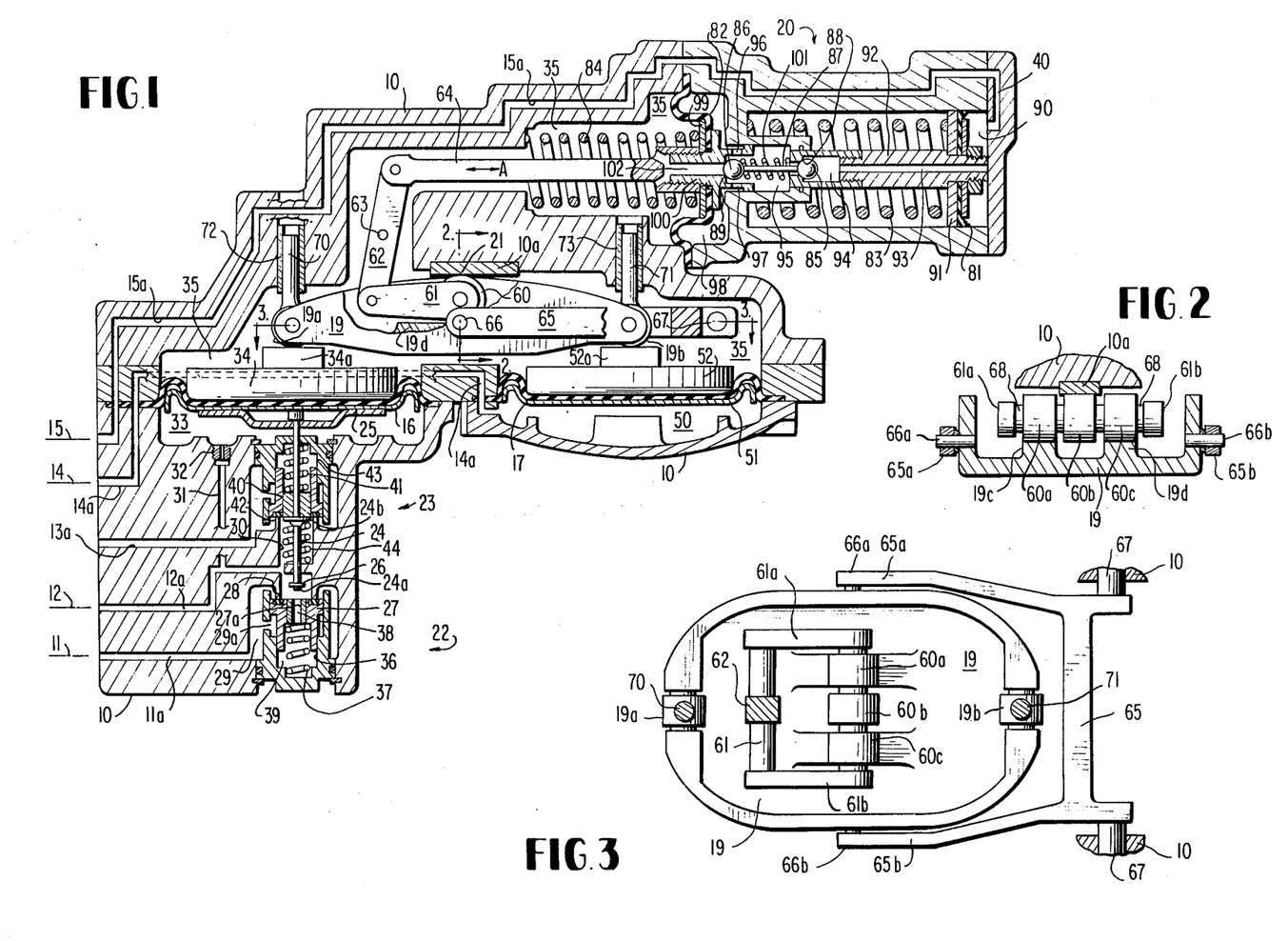
FIG. 1 is a cross-sectioned view of the variable ratio valve of the present invention.
FIG. 2 is a cross-sectioned view of the variable ratio lever taken along section lines 2:2 in FIG. 1.
FIG. 3 is a plane view of the lever, and a cross-section of other portions of the valve taken along section lines 3:3 in FIG. 1.

Referring to FIG. 1, the variable ratio valve may be divided into four main components. The first is the relay valve used to regulate the flow of pressure in the main pressure line. The relay valve receives input pressure from conduit 11, and supplies an output or delivery pressure to conduit 12.

The second portion of the valve is the control means used to receive a control signal from control conduit 14 and reproduce it in the relay valve. This control signal means generally includes the two large diaphragms 16 and 17.

The third major component involves the variable ratio means which is generally indicated by lever 19 interposed between diaphragms 16 and 17.

The fourth component of the valve is the servo mechanism generally indicated at 20 which is used to amplify the ratio control signal from input 15 to vary the fulcrum point 21 for lever 19.

The description of the interaction of the various components of the variable relay valve will be described separately for each of the foregoing sections.

THE RELAY VALVE

The relay valve uses an admission valve generally designated as 22 and an exhaust valve generally indicated at 23 to maintain a constant pressure in delivery line 12. This pressure is dictated by the combined interaction of the control signal pressure present at input 14 and the variable ratio signal pressure present at input 15. At any given point in time, the relay valve will maintain a constant output pressure on delivery line 12a. As will be hereinafter later explained, the control signal pressure supplied to inlet 14a will result in the application of mechanical force to lever 19, and a downward mechanical force on diaphragm 16 through lever pad 34. This action initiates the operation of the relay portion of the relay valve. The relay valve is operated by a single continuous actuating rod 24 which is secured to the diaphragm follower 25 positioned on the equalization side of diaphragm 16. As the actuator rod 24 is moved downwardly by diaphragm follower 25, it first insures that the exhaust valve 23 is seated as illustrated in FIG. 1. Further downward movement of diaphragm follower 25 results in the engagement of stop means 26 with the admission valve 22. Stop means 26 engages the upper surface of valve body 27 with the protruding end 24a engaging the recessed portion 27a of valve body 27. As further downward force is exerted on diaphragm follower 25, valve body 27 is unseated from seat 28 and air under pressure is allowed to pass from inlet passageway 11a to delivery passageway 12a. The mainline brake pipe pressure, or control system pressure, passes through inlet 11a, cylindrical chamber 29, the circular opening defined by valve seat 28, and exits through the delivery passageway 12a. Simultaneously, it pressurizes the intermediate chamber 30 and passes upwardly through the equalization passageway 31 and choke 32 to the equalization chamber 33. Choke 32 is used to dampen transient pressure variations or fluctuations which might other wise cause the valve to oscillate or flutter when seating. As chamber 33 is pressurized, it exerts an upward pressure on diaphragm follower 25 and diaphragm 16, thereby counterbalancing the downward pressure placed on diaphragm follower 25 by lever pad 34 and diaphram 16. The downward forces on diaphragm 16 are exerted by lever 19 as will be hereinafter explained. Diaphragm 16 is sandwiched between lever pad 34 and diaphragm follower 25 and is covered through substantially its entire area on the pressure equalization side by diaphragm follower 25. As the pressure in pressure equalization chamber 33 rises to offset the downward pressure exerted by lever pad 34, the downward motion of actuator rod 24 ceases and the valve begins to stabilize. It should be noted here that diaphragm 16 is subjected to mechanical pressure on the lever pad side, and air pressure on the equalization chamber side. There is no countervailing air pressure present in the space indicated at 35 since this space is normally open to atmospheric pressure. As the force generated in the pressure equalization chamber 33 exceeds the downward mechanical force exerted by lever pad 34, the diaphragm follower 25 and diaphragm 16 are moved upwardly thereby raising actuator rod 24 and allowing valve body 27 to reseat against seat 28. Valve body 27 reciprocates within a cylindrical bore 36 and is biased upwardly by means of a helical spring 37. The tension for spring 37 is selected to ensure a positive seal between valve body 27 and seat 28 under normal operating pressures. Valve body 27 also defines a cylindrical bore 38 which is used to admit operating pressure to chamber 39. Bore 38, chamber 39, and the coaxial chamber 29a are used to equalize pressure on either side of valve body 27 to prevent the operating pressures from exerting a substantial upward or downward movement on valve body 27 when the admission valve is opened or closed.

After the delivery line 12 has been pressurized, and valve body 27 has sealed against seat 28, the valve will remain in a static condition until a change occurs in one of the actuating chambers. If the pressure is suddenly leaked or otherwise reduced in delivery line 12, the pressure in equalization chamber 33 will again become unbalanced and the lever pad 34 will move downwardly thereby readmitting air through inlet passageway 11a, chamber 29, and delivery passageway 12a as hereinbefore described. Similarly, an increase in the control signal pressure at inlet 14a will also result, as will be hereinafter later explained, in an increase in lever pad pressure exerted against diaphram 16 by lever pad 34. As the control signal pressure increases, the pressure on lever pad 34 also increases until the forces acting on either side of diaphragm 16 are again unbalanced, and the diaphragm moves downwardly. As the diagphragm follower 25 moves downwardly, it drives the actuator rod 24 downwardly thereby unseating valve body 27 and admitting more pressure through passageway 11a and chamber 29 to the delivery line 12a, and the equalization chamber 33. This increased pressure will cause a pressure rise in equalization chamber 33 until the forces acting on either side of diaphragm 16 are again balanced, and valve body 27 moves upwardly to lap off, or seal, against the circular seat 28.

Similarly, a reduction in control signal pressure present at conduit 14 will cause a reduction in the mechanical force exerted by lever pad 34. As the downward force exerted by lever pad 34 is reduced, pressre in equalization chamber 33 will exert an upward pressure on diaphragm follower 25 and diaphragm 16 thereby raising actuator rod 24 from the position illustrated in FIG. 1. As actuator rod 24 is raised, exhaust valve 23 is opened by stop means 24b thereby allowing air under pressure to flow from delivery conduit 12a through the intermediate cylindrical chamber 30 to exhaust passageway 13a. Exhaust passageway 13a opens to atmosphere as indicated in FIG. 1. As valve body 40 is moved upwardly, it compresses spring means 41 and raises the valve body from seat 42. Teh pressure in equalization chamber 33 is also exhausted through choke 32, equalization passageway 31 and exhaust passageway 13a until the forces on either side of diaphragm 16 are balanced. When this happens, resilient spring means 41 will drive valve body 40 downwardly to seal or lap off the exhaust valve at seat 42, thereby stabilizing the delivery pressure in passageway 12 at a new, lower load. Exhaust valve 23 is similar in construction to admission valve 22 in that valve body 40 reciprocates within a cylindrical chamber 43 and is biased downwardly by spring means 41 to engage seat 42 under normal operating circumstances.

A resilient means 44 is also provided between admission valve 22 and exhaust valve 23 to open the exhaust valve when no control signal is present at inlet 14a.

THE CONTROL SIGNAL MEANS

In the normal relay valve, the admission valve 22 and exhaust valve 23 would be positioned with a control diaphragm 16 positioned as illustrated in FIG. 1. The inlet control signal present on control line 14 would be presented to the upper side of the diaphragm 16 and would be balanced against the equalizing pressure in chamber 33 as hereinbefore previously discussed. If the operating pressures are either side of diaphragm 16 were equal, the relay valve would produce an output pressure on delivery line 12 equal to the input pressure on control signal input line 14. If differentially sized diaphragms were used, it would be possible to provide a fixed ratio between the input control signal pressure present on line 14 and the output or delivery pressure present on line 12. This ratio would be fixed for any given valve but could be chosen to provide a desired ratio, depending upon the difference in area between the differentially sized pistons.

In the present invention, diaphragm 17 defines with valve body 10 an input control chamber 50 which is pressurized by the air pressure from the control signal input 14 through input passageway 14a. Diaphragm 17 is likewise equipped with a diaphragm follower 51 to assist in equalizing the pneumatic load impressed on the pressurized side of diaphragm 17. A lever pad 52 is also provided on the other side of diaphragm 17 as was previously described with respect to diaphragm 16. The upper sides of diaphragms 16 and 17 open to chamber 35 which is open to atmoshperic pressure.

As illustrated in FIG. 1, diaphragm 17 together with diaphragm follower 51 and lever pad 52 comprise the inlet or input control means and the diaphragm 16 together with diaphragm follower 25 and lever pad 34 comprise the output control means. The pneumatic pressure recceived by the input control means is translated to mechanical force by means of lever 19, and is translated between the input and output means through fulcrum point 21. Any increase in the inlet control signal will result in a pressurization of control chamber 50 and a resulting upward mechanical force on lever pad 52. This upward mechanical force is translated by lever 19 into a downward mechanical force component on lever pad 34. Similarly, any decrease in the input control signal at conduit 14 will result in a decrease in the effective pressurization of chamber 50. This reduces the upward force component on lever pad 52, and allows the pressure present in equalization chamber 33 to drive lever pad 52 downwardly by means of lever 19.

In summation, any increase in the input control pressure at conduit 14 will result in a pressurization and upward movement of lever pad 52, a downward movement of lever pad 34, and the opening of admission valve 22. Any decrease of the input control pressure on conduit 14 will result in a depressurization of chamber 50, a downward movement of lever pad 52, an upward movement of lever pad 34, and the opening of the exhaust valve 23. When forces are equalized, the exhaust valve will agian lap off, re-establishing a fixed pressure in delivery line 12a.

THE VARIABLE RATIO MEANS

The variable ratio means provides the proportioning action of the valve. By varying the ratio of force exerted between the input and output control means, it varies the proportionality of the input control signal pressure present at control point 14 to the output delivery pressure present in conduit 12. The ratio between the input and output control means is varied by moving the fulcrum or pivot point for lever 19 through a predetermined path. The pivot point or fulcrum is indicated generally by the numeral 21 in FIG. 1. The fulcrum comprises three rollers 60a–60c, one of which, 60b, bears against a pressure plate 10a formed with or mounted in body 10. The other two rollers, 60a and 60c, bear against upwardly projecting lands 19c and 19d formed in lever 19. The rollers are moved by means of a yoke 61 which is connected to a crank 62. Crank 62 pivots about pivot point 63 in response to movements of the output rod 64 of the servo mechanism 20. Lever 19 is also secured in place against any lateral or horizontal movement by a yoke means 65 which is pinned to the lever 19 at 66 and to the valve body at 67.

FIGS. 2 and 3 also provide other views of the variable ratio means. FIG. 2 is a cross-sectioned view taken along section lines 2:2 of FIG. 1. FIG. 2 illustrates the lever 19 in cross-section with two upwardly extending lands 19a and 19b. Lever 19 is secured in place by means of yoke 65 which has a pair of outwardly extending arms 65a and 65b as illustrated in FIG. 2. Lever 19 is pinned to yoke 65 by means of pins 66a and 66b. Likewise, the valve body 10 defines a pressure plate 10a for the roller mechanism 60. The roller mechanism defines three rollers 60a, 60b and 60c, together with a central shaft portion 68. The outer extremities of shaft 68 are journaled or pinned to a second yoke 61 which is indicated in FIG. 2 by the numerals 61a and 61b.

A plan view of the foregoing is illustrated in FIG. 3. In this view, the lever 19 is not illustrated in cross-section, but defines a rather flat rocker plate having pressure rollers 19a and 19b pinned in either end. FIG. 3 also illustrates a plan view of the yokes 61 and 65 together with their outwardly extending arms 61a and 61b, and 65a and 65b. The double pivot nature of yoke 65 allows lever 19 to pivot freely about rollers 60a–c and does not affect the fulcrum point for lever 19. The yoke 65 is intended merely to hold lever 19 in a constant lateral position. Since the forces generated in chambers 33 and 50 may vary upwards to one hundred pounds per square inch, the total pressure exerted on lever pads 34 and 52 may be on the order of several hundred pounds. This translates to a force of several thousand pounds per square inch on the bearing surfaces of rollers 60, 19a and 19b. Rollers 19a and 19b bear against upwardly raised projections 34a and 52a defined on the upper surfaces of pressure pads 34 and 52. Rollers 19a and 19b are aided in their precise registration by means of guide pins 70 and 71 which reciprocate within collars 72 and 73. The purpose of pins 70 and 71 is to minimize any shigitng of lever 19 and the consequential shifting of the ratio previously determined by the placement of rollers 60a-c. The rollers 19a and 19b also tend to minimize the frictional losses generated in transmitting loads of this magnitude to the lever pads 34 and 52. As pointed out previously, the per square inch pressure generated between the point of contact of rollers 19a and 19b and their respective pads 34a and 52a are several thousand pounds per square inch.

VARIABLE RATIO SERVO MECHANISM

The fourth component of the proportioning valve is the servo mechanism generally indicated at 20 which is used to amplify the ratio control signal from conduit 15 to vary the fulcrum point 21 of lever 19. The servo mechanism 20 is a force amplifying mechanism that balances incoming air pressure against a specific spring constant. The spring constant of the preferred embodiment was selected with the assumption that the air pressure in the ratio control passageway would never be less than 40 pounds per square inch. For any fibe selected spring constant and air pressure, wherein the spring force is applied to one side of a diaphragm, and the air pressure applied to the other side, the diaphragm will assume a given balanced position. As the air pressure increases, the diaphragm will be displaced in the direction of the spring, and as the air pressure is reduced, the apring will return the diaphragm to its original position, or beyond, depending upon the amount of air reduction.

The servo mechanism illustrated in FIG. 1 uses an input diaphragm and an output diaphragm to reciprocate the output rod 64 in the direction indicated by the arrow A in FIG. 1. As was pointed out previously, movement of the output rod 64 will cause the link 62 to pivot around pivot point 63 thereby changing the relative position of roller 60a-c and the pivot point 21. The displacement of the input diaphragm 81 and the output diaphragm 82 is resisted by first 83 and second 84 helical springs. The servo mechanism 20 is a two stage mechanism wherein output diaphragm 82 provides the driving force necessary to move roller 60a-c along the pressure plate 10a.

The input and output diaphragms are linked together by means of a double seated, double ball valve having an input ball 85 and an output ball 86 linked together by connecting pin 87. The input ball valve seats against valve seat 88 while the output ball valve seats against seat 89. During all normal equalized positions of the servo mechanism 20, both the input and output ball valves are seated against their respective seats.

When the proportioning or ratio control passageway 15a is pressurized, the air pressure pressurizes chamber 90. As chamber 90 is pressurized, the input diaphragm 81 is displaced to the left as indicated in FIG. 1, thereby compressing resilient spring means 83. As diaphragm 81 is moved to the left, diaphragm follower 91 and its coaxial shaft 92 are also displaced to the left. As they are displaced to the left, the air pressure present in chamber 90 also perssurizes passageway 93 and chamber 94. Since at this point in time, the position of the output diaphragm is fixed, the input valve 85 will be unseated from seat 88 as the coaxial shaft 92 is displaced to the left. As input valve 85 is unseated, chamber 95 is pressurized and the air pressure then passes through the radial ports 96 and 97 into chamber 94. As chamber 98 is pressurized, the diaphragm means 82 is displaced to the left against the force of helical spring means 84. Diaphragm means 82 is securely clamped between diaphragm follower 99 and an intermediate diaphragm follower 100. Diaphragm follower 100 threadably engages the output shaft 64 of the servo mechanism 20. Thus as chamber 98 is pressurized, the diaphragm followers 99 and 100 are displaced to the left by diaphragm 82 thereby displacing the output shaft 64 to the left to move the pivot point or fulcrum of lever 19.

When chamber 90 is pressurized, diaphragm 81 and diaphragm follower 91 are displaced to the left against the resilient spring force exerted by the helical spring means 83. At a given predetermined point, the spring constant of spring 83 and the air pressure in chamber 90 are balanced, and diaphragm 81 ceases to move any further. However, since the diaphragm 82 has a substantially larger surface area than does diaphragm 81, it will continue to move to the left by virtue of the air pressure flowing through passageway 93, chambers 94 and 95, and passageways 96 and 97.

Exhaust valve 86 is held in seating engagement with valve seat 89 by virtue of a light helical spring 101. As the diaphragm 82, the diaphragm follower 100 continue to be displaced to the left, they carry exhaust valve 86 with them by virtue of the resilient action of spring 101. As exhuast valve 86 is moved to the left, inlet valve 85 will also move to the left and will eventually seal against valve seat 88 thereby closing communication between the ratio control conduit 15 and chamber 98.

Any subsequent increases in air pressure in ratio control conduit 15 will result in a higher pressurization of chamber 90, a further displacement to the left of diaphragm 81 and coaxial shaft 92. This further diaplacement will again unseat valve 85, allowing the air pressure to pressurize chamber 95, and passageways 96 and 97 to displace diaphragm 82 and diaphragm follower 100 to the left as hereinbefore previously discussed.

Any decrease in air pressure in ratio control passageway 15a will result in a depressurization of chamber 90 and a movement to the right of diaphragm means 81 as the spring force of spring 83 rebalances itself against the new lower air pressure in chamber 90. As the diaphragm follower 91 is displaced to the right, it will also carry with it coaxial shaft 92, and its movement to the right will cause the inlet valve 85 to unseat the exhaust valve 86 by virtue of the connecting link 87. As exhaust valve 86 is unseated from valve seat 89, the air pressure in chamber 98 is allowed to escape through passages 96 and 97 and central bore 102 defined within diaphragm follower 100. Since chamber 35 on the other side of diaphragm 82 is open to atmospheric pressure, the air pressure in chamber 98 is exhausted, thereby allowing spring means 84 to displace diaphragm follower 100 and output shaft 64 to the right as illustrated in FIG. 1. This movement will cause a pivoting of link 62 around pivot point 63 and a repositioning of roller 60 to a new pivot point 21.

Any further reductions in air pressure will again cause a displacement to the right of diaphragm 81 and diaphragm follower 91, and a commensurate unseating of exhaust valve 86 and depressurization of chamber 98.

In summation, the relative reciprocal position of the pivot point 21 is determined by the balance point achieved between the spring constant of helical spring 83 and the pneumatic force exerted within the chamber 90 against diaphragm 81 and diaphragm follower 91. The actual force used to move the fulcrum or pivot point is generated by diaphragm 82 and spring means 84. Ths means that any random changes in the position of output diaphragm 82 caused, for example, by mechanical feed-back through links 61, 62 and 64 due to cocking of lever 19 as diaphragms 16 and 17 move lever 19 from a horizontal position, will not be transferred to input diaphragm 81, which always maintains the position set by the pneumatic force in chamber 90 and spring 93. Such mechanical feed-back will only lift valve 85 from its seat 88 and cause more fluid to flow to the pressurized side of output diaphragm 82, thereby causing diaphragm 82 to overcome the feedback and return the fulcrum or pivot point to the location established by the position of input diaphragm 81.

Figure 4:
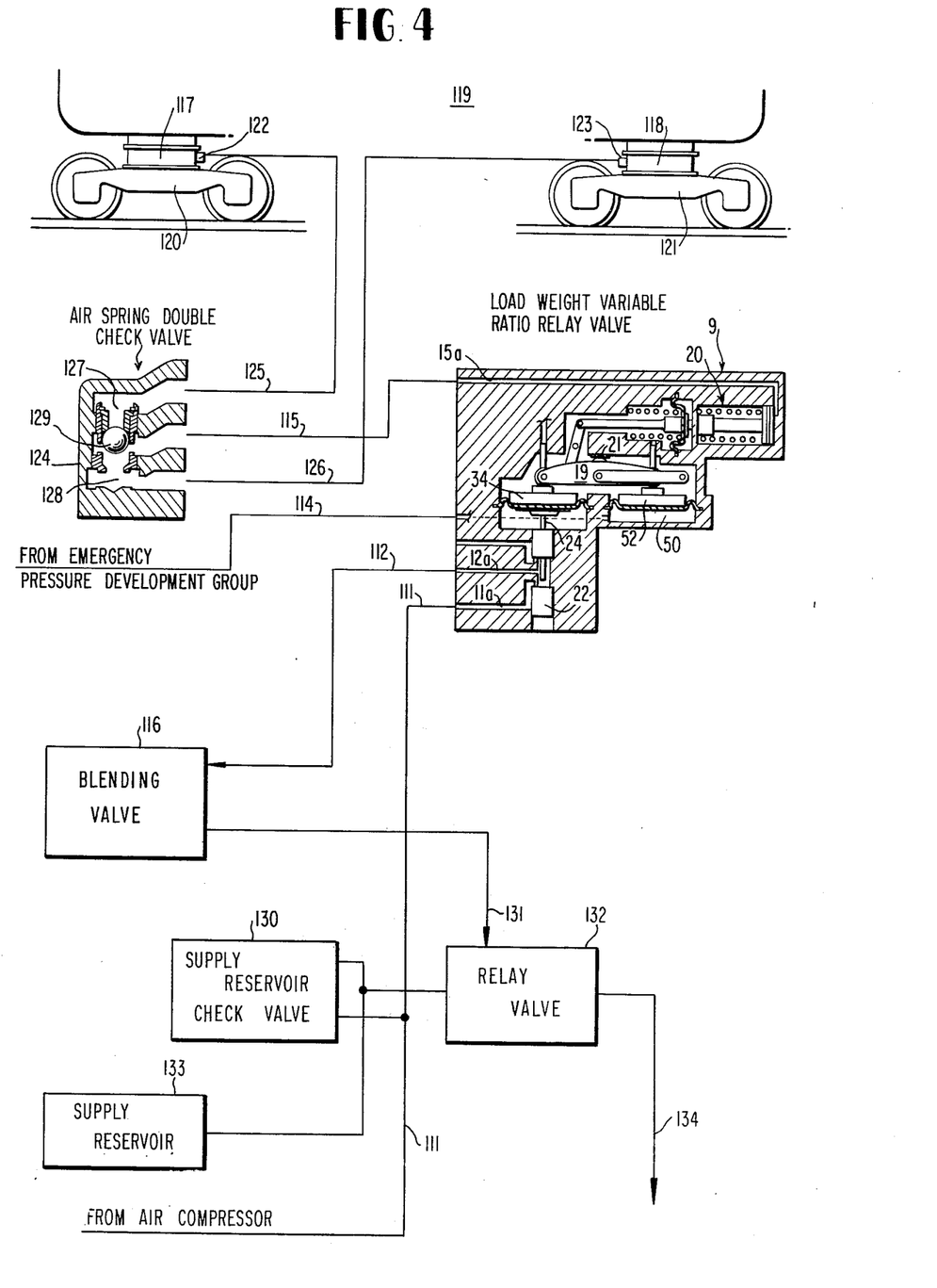
FIG. 4 is the variable ratio relay valve employed in a variable load system.

FIG. 4 illustrates the variable ratio relay valve diagrammatically in a portion of a brake control system. The illustration of FIG. 4 uses the variable ratio relay valve as a load-weigh valve or a variable load valve. As illustrated in FIG. 4, the pressurized air is supplied from an air compressor through conduit 111 to the inlet passageway 11a. The output of the relay valve 9 is supplied through delivery port 12a to conduit 112 to a blending valve 116. The incoming control signal is received from another portion of the brake control system, and in the particular embodiment illustrated in FIG. 4 it is received from the emergency and pressure development group. This group of control systems provides an air pressure control signal on conduit 114 which normally varies with the speed of the vehicle. The pressure developed in conduit 114 will vary between 50 and 75 psi. The variation between 50 and 75 psi is a speed tapered rate reflecting an analog derivative of the speed of the vehicle. Under normal operation, as the speed of the vehicle increases, the pressure present in conduit 114 will increase from 50 to 75 psi, and the pressure in chamber 50 will also increase from 50 to 75 psi. As this pressure increases, it will result in an upward movement of lever pad 52 and a downward movement of lever pad 54 by virtue of lever 19 and fulcrum point 21. As the lever pad 34 is displaced downwardly, and actuator rod 24 will open the admission valve 22 to admit air pressure from the air supply conduit 111 and deliver it through delivery passageway 12a and conduit 112 to the blending valve 116.

For the system illustrated inn FIG. 4, the input control signal comprises the pressure developed from the pressure develop group and impressed on conduit 14. The variable ratio control signal which determines the ratio between the control signal and the output signal on 112 is developed by the load weigh system. The load-weigh system comprises air bags 117 and 118 which are disposed on either end of the vehicle 119 between the vehicle and the vehicle trucks 120 and 121.

The air springs 117 and 118 also include regulating valves 122 and 123. These valves are actuated in response to vertical movements of the car body caused by variations in load on the car body to thereby increase or decrease the pressure in air springs 117 and 118. If the load on the car body increases, the car body moves downwardly towards the trucks and actuates regulating valves 122 and 123 to increase the pressure in air springs 117 and 118, which in turn raises the car body back to its original position. Conversely, if the load on the car decreases, the car body rises with respect to the trucks and actuates regulating valve mechanisms 122 and 123 to decrease the air pressure in air springs 117 and 118 and thereby lower the car back to its original position. As the car load increases and decreases, the pressure present in air springs 117 and 118 increases or decreases. This fixed relationship between the load carried by the car body and the pressure in the air springs is used to regulate the ratio control portion of the variable ratio relay valve. In the preferred embodiment of the present invention, the variable ratio relay valve may be varied from 80 percent of its input control signal pressure to 100 percent of its input control signal pressure. This 20 percent variation or change in ratio is determined by the loading of the vehicle 119. When the vehicle is fully loaded, the variable ratio relay valve reproduces the inlet control signal perssure on a 1:1 basis on mainline delivery conduit 112.

Conversely, when the car is empty the variable ratio relay valve reproduces the pressure on a 0.8:1 ratio to provide 80 percent of the incoming control signal pressure at the mainline delivery conduit 112.

A double check valve 124 is used to select the highest control pressure from air springs 117 and 118. Check valve 124 receives incoming air pressure from conduit 125 connected to air spring 117 and from conduit 126 connected to air spring 118. The air pressure in conduit 125 pressurizes chamber 127 while the air pressure present in conduit 126 pressurizes chamber 128. Ball valve 129 selects the higher of the two input pressures by virtue of the pneumatic pressure within chambers 127 and 128. As illustrated in FIG. 4, when the pressure in air spring 126 is higher, ball valve 129 is moved upwardly to open communication between air spring 126 and output conduit 115. If the pressure in air spring 118 were to decrease by virtue of the unloading of the vehicle, to the extent that air pressure in 117 became higher, the increased air pressure in air spring 117 and conduit 125 would displace the ball valve 129 downwardly to open communication between conduit 125 and conduit 115. The air spring pressure is then conveyed through ratio control inlet passageway 15a to servo mechanism 20. As was pointed out previously, this force is amplified by the servo mechanism 20 and used to shift the pivot point 21 of lever 19 in response to pressure variations in the ratio input line 115, and air springs 117 and 118.

The output of the variable ratio relay valve is supplied to a blending valve 116 which mixes or blends the frictional braking effort with the dynamic braking effort of the vehicle. The output pressure of the blending valve is conveyed through conduit 131 to relay valve 132 which in turn receives the operating air pressure for the brake pipe from supply reservoir 133. Check valve 130 serves to maintain supply reservoir 133 at a predetermined pressure sufficient to enable the brake system to perform 10 to 15 brake applications without recharging in the event of a compressor failure.

The output of realy valve 132 is delivered to conduit 134 and may be conveyed to the brake actuators if the brake system is a pneumatic system, or to a pneumatic to hydraulic convertor if the brake actuators are hydraulic.

Although a specific system has been illustrated in FIG. 4, it should be understood that the system is also applicable to brake systems that would not include a blending valve 116, and could be used in a freight car braking system to provide a simple and inexpensive load-weigh system for the vehicle.

While the foregoing has described the preferred embodiment of the invention, various modifications may become apparent to those skilled in the art to which this invention relates. Accordingly, all such modifications are included within the intended scope of the invention as recited in the following claims.

What is claimed is:

1. In a variable ratio relay valve of the type including a relay valve portion having inlet and outlet ports and a movable valve element actuable to permit fluid flow from said inlet port to said outlet port in response to a control means; and control means for actuating said valve element, said control means comprising means responsive to a first input control pressure for providing an actuating force, means for applying an actuating force to said valve element and means operably connecting said force providing means and said force applying means for adjustably varying the proportionality between the force provided by said force providing means and the force applied to said valve element by said force applying means in response to a servo mechanism, an improved servo mechanism comprising:
   an input diaphragm responsive to second input control pressure and mounted for reciprocating movement against a first resilient biasing means;
   an output diaphragm response to said second input control pressure, mounted for reciprocating movement against a second resilient biasing means and operatively connected to said proporitonality varying means; and
   valve means linking said input and output diaphragms for transferring fluid from the pressurized side of said input diaphragm to the pressurized side of said output diaphragm in response to movement of said input diaphragm due to a rise in said second input control pressure and/or movement of said output diaphragm due to mechanical feed-back from said proportionality varying means.

2. A variable ratio relay valve as described in claim 1, further comprising means for venting the pressurized side of said output diaphragm in response to a decrease in said second input control pressure.

3. In a variable ratio relay valve of the type including a realy valve portion having inlet and outlet ports and a movable valve element actuable to permit fluid flow from said inlet port to said outlet port in response to a control means; and control means for actuating said valve element, said control means having a housing and comprising means responsive to a first input control pressure for providing an actuating force and means for applying an actuating force to said valve element, an improved means operably connecting said force providing means and said force applying means for adjustably varying the porportionality between the force provided by said force providing means and the force supplied to said valve element by said force applying means, comprising:
   a yoke pivoted to said housing and having a pair of outwardly extending arms;
   a lever pivoted between said outwardly extending arms, said lever having rollers at either end thereof for receiving said actuating force at one end and for applying said actuating force at the other end;
   a fulcrum roller mounted between said housing and said lever and adapted for movement between the ends of said lever; and
   servo-mechanism means for moving said fulcrum roller.

4. A variable ratio relay valve as described in claim 3, wherein said means for moving the fulcrum roller comprises:
   an input diaphragm responsive to a second input control pressure and mounted for reciprocating movement against a first resilient biasing means;
   an output diaphragm responsive to said second input control pressure, mounted for reciprocating movement against a second resilient biasing means and operatively connected to said fulcrum roller for movement thereof; and
   valve means linking said input and output diaphragms for transferring fluid from the pressurized side of said input diaphragm to the pressurized side of said output diaphragm in response to movement of said input diaphragm due to a rise in said second input control pressure and/or movement of said output diaphragm due to mechanical feed-back from said proportionality varying means.

5. A variable ratio relay valve as described in claim 4, further comprising means for venting the pressurized side of said output diaphragm in response to a decrease in said second input control pressure.

6. A variable ratio relay valve as described in claim 3, further comprising guide pins attached to the ends of said lever and mounted for sliding movement in said housing whereby said rollers are maintained in position for receiving and applying said forces.

* * * * *

UNITED STATES PATENT AND TRADEMARK OFFICE
CERTIFICATE OF CORRECTION

PATENT NO. : 3,881,784
DATED : May 6, 1975
INVENTOR(S) : Thomas Engle

It is certified that error appears in the above-identified patent and that said Letters Patent are hereby corrected as shown below:

In the Abstract, line 3, delete "mainline".

Column 1, line 9, delete "subways" and insert -- subway --;

line 14, delete "broke" and insert --brake--;

line 38, after "stop" insert -- a --;

line 50, delete "cna" and insert -- can --.

Column 2, line 6, delete "Ths" and insert -- This --;

line 27, delete "te" and insert -- the --.

Column 4, line 64, delete "pressre" and insert -- pressure --.

Column 5, line 7, delete "Teh" and insert -- The --.

Column 6, line 15, delete "agian" and insert --again--.

UNITED STATES PATENT OFFICE
CERTIFICATE OF CORRECTION

PATENT NO. : 3,881,784
DATED : May 6, 1975
INVENTOR(S) : Thomas Engle

It is certified that error appears in the above-identified patent and that said Letters Patent are hereby corrected as shown below:

Column 7, line 10, delete "shigitng" and insert -- shifting --;

line 31, delete "fibe" and insert --given--;

line 37, delete "apring" and insert -- spring --.

Column 8, line 3, delete "perssurizes" and insert -- pressurizes --;

line 37, delete "exhuast" and insert -- exhaust --;

line 45, delete "diaplace" and insert -- displace --.

Column 9, line 15, delete "Ths" and insert -- This --.

Column 11, line 3, delete "realy" and insert -- relay--;

line 36, after "to" insert -- a --;

line 39, delete "response" and insert --

UNITED STATES PATENT OFFICE
CERTIFICATE OF CORRECTION

PATENT NO. : 3,881,784
DATED : May 6, 1975
INVENTOR(S) : Thomas Engle

It is certified that error appears in the above-identified patent and that said Letters Patent are hereby corrected as shown below:

responsive --;

line 42, delete "proporitonality" and insert -- proportionality --.

Column 12, line 2, delete "realy" and insert -- relay --.

Signed and Sealed this seventh Day of October 1975

[SEAL]

Attest:

RUTH C. MASON
Attesting Officer

C. MARSHALL DANN
Commissioner of Patents and Trademarks